US009158971B2

(12) United States Patent
Gaidon et al.

(10) Patent No.: US 9,158,971 B2
(45) Date of Patent: Oct. 13, 2015

(54) SELF-LEARNING OBJECT DETECTORS FOR UNLABELED VIDEOS USING MULTI-TASK LEARNING

(71) Applicant: Xerox Corporation, Norwalk, CT (US)

(72) Inventors: Adrien Gaidon, Grenoble (FR); Gloria Zen, Trento (IT); José Antonio Rodriguez Serrano, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 65 days.

(21) Appl. No.: 14/195,150

(22) Filed: Mar. 3, 2014

(65) Prior Publication Data

US 2015/0248586 A1    Sep. 3, 2015

(51) Int. Cl.
G06K 9/00 (2006.01)
G06K 9/62 (2006.01)
G06K 9/46 (2006.01)

(52) U.S. Cl.
CPC .......... G06K 9/00711 (2013.01); G06K 9/4604 (2013.01); G06K 9/6269 (2013.01)

(58) Field of Classification Search
USPC ................................................. 382/181–231
See application file for complete search history.

(56) References Cited

U.S. PATENT DOCUMENTS

| | | | |
|---|---|---|---|
| 5,684,715 A * | 11/1997 | Palmer | 348/473 |
| 6,724,915 B1 * | 4/2004 | Toklu et al. | 382/103 |
| 7,236,652 B2 | 6/2007 | Kasutani | |
| 7,627,171 B2 * | 12/2009 | Hampshire et al. | 382/173 |
| 7,756,341 B2 | 7/2010 | Perronnin | |
| 7,817,822 B2 * | 10/2010 | Sun et al. | 382/103 |
| 7,885,466 B2 | 2/2011 | Perronnin | |
| 7,885,794 B2 | 2/2011 | Liu et al. | |
| 8,111,923 B2 | 2/2012 | Csurka | |
| 8,150,858 B2 | 4/2012 | Perronnin et al. | |
| 2004/0228530 A1 * | 11/2004 | Schwartz et al. | 382/173 |
| 2006/0023916 A1 * | 2/2006 | Yang et al. | 382/103 |
| 2007/0065025 A1 * | 3/2007 | Paniconi et al. | 382/236 |
| 2007/0258648 A1 | 11/2007 | Perronnin | |
| 2007/0274561 A1 * | 11/2007 | Rhoads et al. | 382/100 |
| 2008/0198094 A1 * | 8/2008 | Laughlin | 345/1.1 |

(Continued)

OTHER PUBLICATIONS

ImageNet Large Scale Visual Recognition Challenge 2012 (ILSVRC2012) downloaded at http://www.image-net.org/challenges/LSVRC/2012, on Feb. 12, 2014, pp. 1-3.

(Continued)

*Primary Examiner* — Alex Liew
(74) *Attorney, Agent, or Firm* — Fay Sharpe LLP

(57) ABSTRACT

A system and method enable generating a specific object detector for a category of interest. The method includes identifying seed objects in frames of a video sequence with a pre-trained generic detector for the category. An appearance model is iteratively learned for each of the seed objects using other frames in which the seed object is identified. The appearance models are learned jointly to optimize a loss function which accounts for the loss of incorrectly labeling sub-images and a regularization term which measures a distance between the appearance models. The loss of incorrectly labeling sub-images is determined using a motion model which predicts the location of the seed object in the subsequent frames so that sub-images outside the location that the current appearance model contribute to the loss. The specific object detector is then generated by aggregating the optimized appearance models.

21 Claims, 4 Drawing Sheets

(56) References Cited

U.S. PATENT DOCUMENTS

| | | | |
|---|---|---|---|
| 2008/0240572 | A1 | 10/2008 | Hoshii |
| 2008/0317358 | A1 | 12/2008 | Bressan et al. |
| 2009/0208118 | A1* | 8/2009 | Csurka .................. 382/228 |
| 2009/0238406 | A1* | 9/2009 | Huang et al. ............ 382/103 |
| 2010/0082615 | A1 | 4/2010 | Clinchant et al. |
| 2010/0092084 | A1 | 4/2010 | Perronnin et al. |
| 2010/0098343 | A1 | 4/2010 | Perronnin et al. |
| 2010/0189354 | A1 | 7/2010 | de Campos et al. |
| 2010/0226564 | A1 | 9/2010 | Marchesotti et al. |
| 2010/0318477 | A1 | 12/2010 | Perronnin et al. |
| 2011/0026831 | A1 | 2/2011 | Perronnin et al. |
| 2011/0040711 | A1 | 2/2011 | Perronnin et al. |
| 2011/0052063 | A1 | 3/2011 | McAuley et al. |
| 2011/0072012 | A1 | 3/2011 | Ah-Pine et al. |
| 2011/0091105 | A1 | 4/2011 | Perronnin |
| 2011/0137898 | A1 | 6/2011 | Gordo et al. |
| 2011/0184950 | A1 | 7/2011 | Skaff et al. |
| 2012/0045134 | A1 | 2/2012 | Perronnin et al. |
| 2012/0076401 | A1 | 3/2012 | Sánchez et al. |
| 2012/0143853 | A1 | 6/2012 | Gordo et al. |
| 2012/0158739 | A1 | 6/2012 | Ah-Pine et al. |
| 2012/0194644 | A1* | 8/2012 | Newcombe et al. ............ 348/46 |

OTHER PUBLICATIONS

Alexe, et al., "Measuring the objectness of image windows," IEEE Trans. on PAMI, vol. 34, No. 11, pp. 2189-2202 (2012).
Andriluka, et al, "People-Tracking-by-Detection and People-Detection-by-Tracking," CVPR, pp. 1-8 (2008).
Baker, et al. "Lucas-Kanade 20 years on: a unifying framework," ICCV, vol. 56, pp. 221-255 (2003).
Bottou, L., "SGD" downloaded at http://leon.bottou.org/projects/sgd on Feb. 19, 2014.
Chen, et al., "Efficient Maximum Appearance Search for Large-Scale Object Detection," CVPR, pp. 3190-3197 (2013).
Cinbis, et al., "Segmentation Driven Object Detection with Fisher Vectors," ICCV, pp. 1-8 (2013).
Dalal, et al., "Histograms of Oriented Gradients for Human Detection," CVPR, pp. 886-893 (2005).
Everingham, et al., The Pascal visual object classes (VOC) challenge. Intern'l J. Computer Vision (ICCV), 88(2): pp. 303-338 (2010).
Everingham, et al., The PASCAL VOC Challenge 2012 Results, pp. 1-12 (2012) downloaded at http://pascallin.ecs.soton.ac.uk/challenges/VOC/voc2012/results/index.html.
Evgeniou, et al., "Regularized Multi-Task Learning," SIGKDD, pp. 109-117 (2004).
Felzenszwalb, et al., "Object Detection with Discriminatively Trained Part-Based Models," IEEE Trans. on PAMI, 32(9): pp. 1627-1645 (2010).
Feris, et al., "Large-scale vehicle detection, indexing, and search in urban surveillance videos," IEEE Trans. on Multimedia 14(1): pp. 28-42 (2012).
Fragkiadaki, et al., "Two-Granularity Tracking: Mediating Trajectory and Detection Graphs for Tracking Under Occlusions," In ECCV, vol. Part V, pp. 552-565 (2012).
Jégou, et al.: "Aggregating local image descriptors into compact codes," IEEE Trans. on Pattern Analysis and Machine Intelligence, vol. 34 No. 9, pp. 1704-1716 (2012).
Kalal, et al., "Tracking-Learning-Detection," IEEE Transactions on Pattern Analysis and Machine Intelligence, vol. 34 No. 7, pp. 1409-1422 (2012).
Okuma, et al., "Self-Learning for Player Localization in Sports Video," Technical report. arXiv:1307.7198v1, pp. 1-10 (Jul. 27, 2013).
Pellegrini, et al., "You'll Never Walk Alone: Modeling Social Behavior for Multi-Target Tracking," CVPR, pp. 261-268 (2009).
Perronnin, et al., "Fisher Kernels on Visual Vocabularies for Image Categorization," In Computer Vision and Pattern Recognition (CVPR), pp. 1-8 (2007).
Perrçnnin, et al., "Large-Scale Image Categorization with Explicit Data Embedding," In Computer Vision and Pattern Recognition (CVPR), pp. 2297-2304 (2010).
Sánchez, et al., Image Classification with the Fisher Vector: Theory and Practice. International Journal of Computer Vision, 105, 105(3) pp. 222-245 (Jun. 12, 2013).
Schulter, et al., "Unsupervised Object Discovery and Segmentation in Videos," BMVC, pp. 53:1-53.12 (2013).
Stauffer, et al., "Adaptive background mixture models for real-time tracking," CVPR, vol. 2, pp. 2246-2252 (1999).
Tang, et al., "Shifting Weights: Adapting Object Detectors from Image to Video," NIPS, pp. 647-655 (2012).
Torralba, et al., "Unbiased Look at Dataset Bias," CVPR, pp. 1521-1528 (2011).
Vázquez, et al., "Unsupervised Domain Adaptation of Virtual and Real Worlds for Pedestrian Detection," ICPR, pp. 3492-3495 (2012).
Wang, et al., "Transferring a Generic Pedestrian Detector Towards Specific Scenes," CVPR, pp. 4321-4328 (2012).
Wang, et al., "Detection by Detections: Non-parametric Detector Adaptation for a Video," CVPR, pp. 350-357 (2012).
Sánchez, et al., "High-dimensional signature compression for large-scale image classification," CVPR, pp. 1665-1672, (2011).
Lowe, "Distinctive image features from scale-invariant keypoints", IJCV, pp. 1-28, Jan. 5, 2004.
Csurka, et al., "Visual Categorization with Bags of Keypoints," ECCV Workshop, pp. 1-16, (2004).

* cited by examiner

SELF-LEARNING OBJECT DETECTORS FOR UNLABELED VIDEOS USING MULTI-TASK LEARNING

BACKGROUND

The exemplary embodiment relates to object detection and finds particular application in connection with an automated system and method for generating an object detector based on a sequence of images.

Algorithms for the automatic analysis of video data have been developed for detecting objects of interest, such as pedestrians and vehicles, in videos. Applications for such methods include long-term tracking of objects (K. Fragkiadaki, et al, "Two-granularity tracking: mediating trajectory and detection graphs for tracking under occlusions," ECCV (2012)), event retrieval (R. Feris, et al., "Large-scale vehicle detection, indexing, and search in urban surveillance videos," IEEE Trans. on MM, (2012)), and human behavior understanding (S. Pellegrini, et al., "You'll never walk alone: Modeling social behavior for multi-target tracking," CVPR (2009)). In one approach to object detection, an "object vs. background" classifier is applied to a sliding window which is traversed over all possible locations in an image (see, N. Dalai, et al., "Histograms of oriented gradients for human detection," CVPR (2005); P. F. Felzenszwalb, et al., "Object detection with discriminatively trained part-based models," IEEE TPAMI (2010), hereinafter, "Felzenszwalb 2010"). To achieve a good accuracy and low false alarm rate, such a classifier is trained using manually annotated images defining the category of interest. To account for variability within the category, many examples may be needed. Accordingly, object detectors typically exploit large, high-quality, curated training data from a specific source of images. For example, labeled images in selected visual object classes, such as from the PASCAL VOC challenges or ImageNet may be employed. This form of supervised learning, however, is expensive and may still not provide object detectors that generalize well to a new source of data as the training examples may not be representative of the target domain of application (see, A. Torralba and A. A. Efros, "Unbiased look at dataset bias," CVPR (2011)).

As an example, video cameras could be positioned at different locations to capture video images for identifying objects in the same category, such as cars or pedestrians. Conditions at each of the locations may be different, for example in terms of lighting, type of buildings, and so forth. To address these differences, a specific detection model for the object of interest could be generated for each video camera. This would entail regular collection and labeling of data and may be cost prohibitive for a large number of cameras. As an alternative, a generic detector could be learned and employed for all the cameras. However, this approach may lead to suboptimal performance, for example, exhibiting high precision at very low recall, with only the few best ranked detections being correct.

There remains a need for a reliable method for generating detection models for objects of interest that are well adapted to different conditions without requiring large quantities of specific training data.

INCORPORATION BY REFERENCE

The following references, the disclosures of which are incorporated herein by reference in their entireties, are mentioned:

Methods for object classification are described, for example, in U.S. Pub. No. 20120076401, published Mar. 29 2012, entitled IMAGE CLASSIFICATION EMPLOYING IMAGE VECTORS COMPRESSED USING VECTOR QUANTIZATION, by Jorge Sanchez, et al.; and U.S. Pub. No. 20120045134, published Feb. 23, 2012, entitled LARGE SCALE IMAGE CLASSIFICATION, by Florent Perronnin, et al.

BRIEF DESCRIPTION

In accordance with one aspect of the exemplary embodiment, a method for generating a specific object detector includes, with a generic detection model trained to identify objects in an object category, identifying a plurality of seed objects, each seed object being identified in a frame of a video sequence. For a plurality of iterations and for each of the plurality of seed objects with a current motion model, the method includes identifying an object region in a different frame of the video sequence where the seed object is predicted to be located, and with a current appearance model, labeling sub-images of the different frame as positive or negative, and identifying as hard negatives, sub-images outside the object region that the current appearance model labels as positive for the object category. The method further includes jointly updating the current appearance models for the plurality of seed objects to optimize a loss function which includes a regularization term that is a function of a distance between the current appearance models. The specific object detector is formed by aggregating the appearance models of at least one of the iterations.

One or more of the steps of the method may be performed with a computer processor.

In accordance with another aspect of the exemplary embodiment, a system for generating a specific object detector includes a generic detection model trained to identify objects in an object category, the generic detection model identifying a plurality of seed objects, each seed object being identified in a frame of a video sequence. A tracking component instantiates an ensemble of trackers, one tracker for each of a plurality of seed objects detected with the generic detection model, each tracker comprising a motion model and a detection model. A learning component learns a specific object detector. The learning includes, for a plurality of iterations, and for each of the plurality of seed objects, with a current motion model, identifying an object region in a different frame of the video sequence where the seed object is predicted to be located, and with a current appearance model, labeling sub-images of the different frame as positive or negative, and identifying as hard negatives, sub-images outside the object region that the current appearance model labels as positive for the object category. The learning includes updating the current appearance models for the plurality of seed objects by optimizing a loss function which includes a loss term, which takes into account the hard negatives, and a regularization term that is a function of a distance between the current appearance models. The method further includes aggregating the appearance models of at least one of the iterations to generate the specific object detector. A processor implements the generic detection model, tracking component, and learning component.

In accordance with another aspect of the exemplary embodiment, a method for generating a specific object detector includes, with a generic detection model trained to identify objects in an object category, identifying a plurality of seed objects, each seed object being identified in a frame of a video sequence. A tracker is instantiated for each of the seed objects for tracking the seed object in subsequent frames of the video sequence. Each tracker includes a motion model and an appearance model. The motion model is configured for identifying a region of a subsequent frame where the seed object is expected to be located. The appearance model is configured for assigning a label that is selected from positive and negative for the seed object to each of a set of sub-images of the subsequent frame, hard negatives being identified as the sub-images in the set of sub images which are assigned a positive label by the appearance model and which are outside the identified region. A specific detector for the category of objects is learned which includes jointly learning the appearance models by sampling the sub-images and iteratively updating the appearance models to optimize a loss function which includes a regularization term, which is a function of a distance between the current appearance models, and a loss term which aggregates, over the appearance models, the loss incurred by classifying a set of sub-images erroneously with the current appearance model, based, in part, on the identified hard negatives, and aggregating the updated appearance models.

One or more of the steps of the method may be performed with a computer processor.

DETAILED DESCRIPTION

The exemplary embodiment provides a system and method for generating a category-level object detection model through multi-task learning. The method is particularly suited to generating a detector for moving objects, such as vehicles, people, or other animals or birds and/or when the camera is moving, i.e., when there is a relative motion between the camera and the objects being detected. However, the method is also suited to cases in which the objects are static.

In one embodiment, unsupervised transfer learning is employed to construct a category-level detection model incrementally for each of a set of cameras. Each detection model is automatically adapted to a respective camera and its environment by automatically generating training data from the video stream generated by that camera. This allows the on-line adaptation of a generic detection model to be achieved at low cost. The learned appearance-based, category-level object detection model is thus specific to a new video stream, without the need for manual annotations of the video images.

The method provides for automatically eliciting a reliable set of positive and negative examples, in particular hard negatives, which are beneficial for performance, from the video stream in order to train the specific detection model in an efficient on-line manner.

Figure 1:
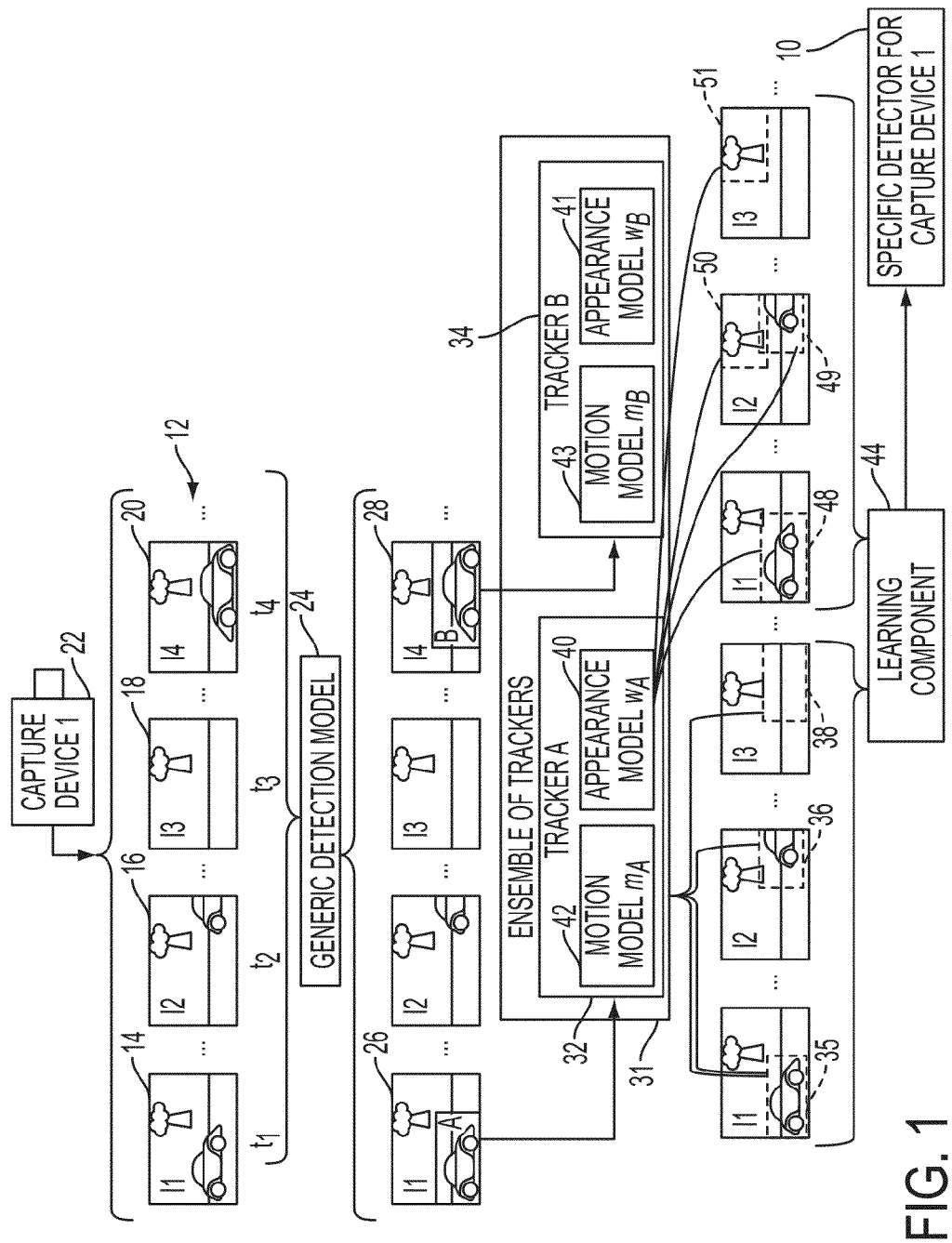
FIG. 1 is an overview of the exemplary system and method.
Figure 2:
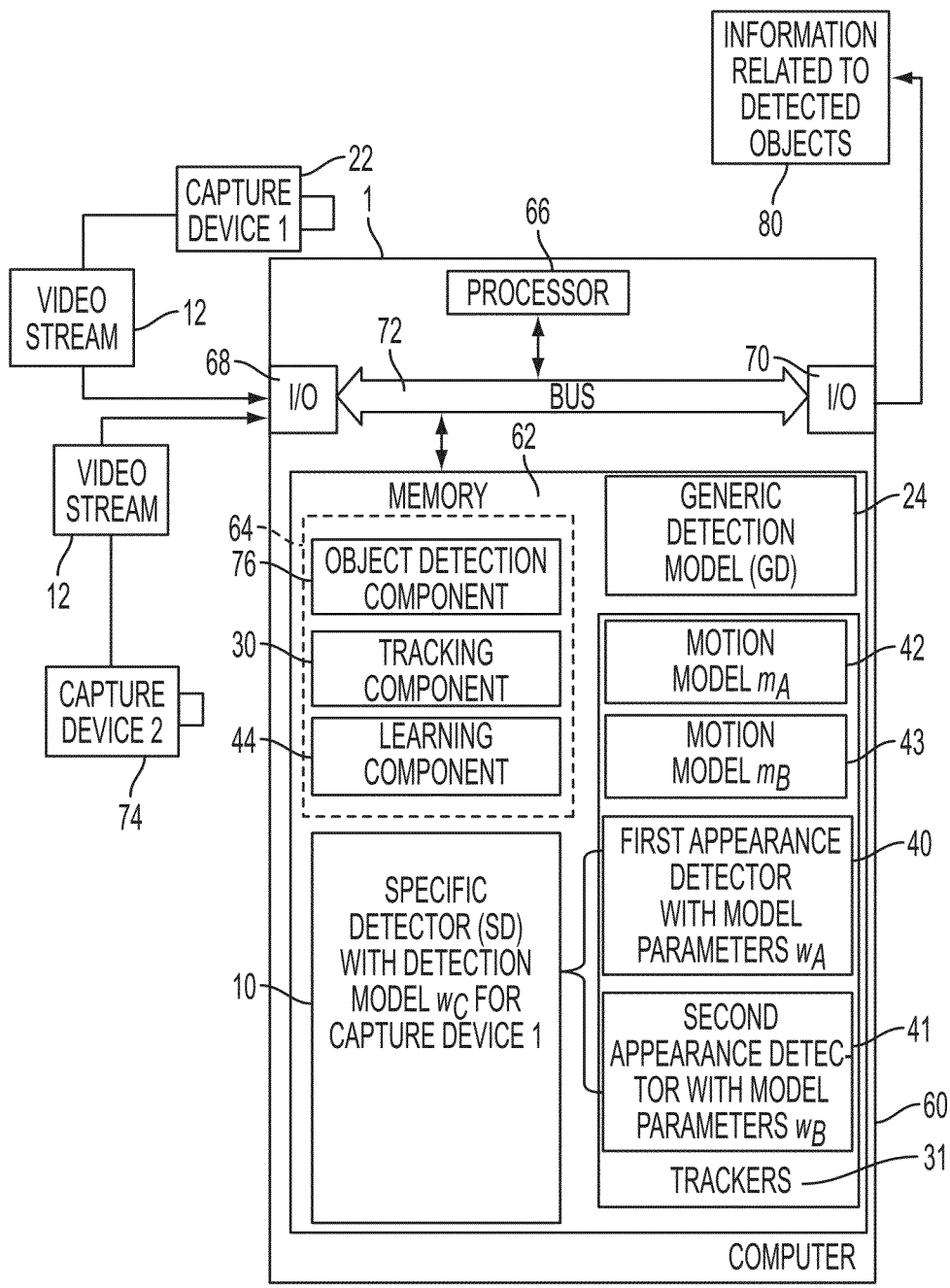
FIG. 2 is a functional block diagram of a system for generating a tailored category-level object detector in accordance with one aspect of the exemplary embodiment.

With reference to FIG. 1, which provides a simplified overview of the system and method, the method includes unsupervised on-line learning of an appearance-based, category-level object detector 10 that is specific to a sequence 12 of images 14, 16, 18, 20, etc., such as a video captured by a video camera 22 at a particular location. The input to the exemplary system 1, shown in greater detail in FIG. 2, is an unlabeled and previously unseen video stream 12, which is referred to herein as the target video. Each image 14, 16, 18, 20 is captured at a respective time $t_1$, $t_2$, $t_3$, $t_4$, etc., which may be equally spaced in time from the previous and next image in the sequence. For example, the images are spaced in time by about 5 seconds or less, or 1 second, or less, or 0.1 seconds, or less. The spacing between images may depend, in part, on the expected speed at which the object moves relative to the frame, with longer times being possible for slower moving objects. For example, where the objects are people or vehicles, the images may be captured at a rate of 25 frames per second, thus spaced in time by about 40 milliseconds.

The system 1 employs a generic object detection model (GD) 24 which is specific to a category of interest, here cars. The generic detection model 24 is pre-trained on a fixed, labeled, general-purpose object dataset which includes images of objects in the category of interest, in one example, images of cars. The training images may be still images or images derived from video sequences captured by one or a plurality of different image capture devices. Generally the training images do not include images captured by capture device 22, although in some embodiments, it is contemplated that a subset of the images may have been captured by capture device 22. The training images are captured at some time prior to time $t_1$. The trained generic detector 24 is expected to be able to identify at least some of the objects 26, 28 in the sequence 12 of images as being of the predefined category. Any suitable generic detector 24 can be used herein and can be simply regarded as a black-box.

The generic detector 24 is applied to the target video 12 to identify a candidate set of such "seed" detections 26, 28, etc. at high precision and low recall. For example, the generic detector 24 may rank a larger set of candidate detections (based on a detection confidence score which depends on the internal design of the detector), and the most highly ranked are then used as the seed detections. Due to the selection of only the most likely detections, the seed detections have a high probability of being properly labeled with the category of interest.

A tracking component 30 (FIG. 2) initializes an ensemble 31 of trackers which include a respective appearance-based tracker 32, 34 for each specific detected object instance 26, 28. The exemplary method employs a tracking-by-detection algorithm which is based on Positive-Negative (P-N) learning (see, for example, Z. Kalal, et al., "Tracking-learning-detection," IEEE TPAMI 34(7):1409-1422 (2012), "Kalal 2012"), but extends this framework to the tracking of multiple targets using multi-task learning. For example, as shown in FIG. 1, given a bounding box 35 for a given seed detection 26, the tracker 32 predicts candidate, bounded object regions 36, 38 within which the object instance 26 is predicted to be located in at least one subsequent image in the sequence 12. The predicted object region(s) 36, 38, etc. are stored.

Each tracker includes a respective instance-level appearance detector 40, 41, including a detection model (set of parameters) denoted $w_i$, which is initialized for each seed 26, 28, and a respective motion model 42, 43, denoted $m_i$, which predicts the candidate object regions 36, 38. A learning component 44 jointly learns the appearance model parameters $w_i$ for the appearance detectors 40, 41 that are used by each tracker with a regularized multi-task learning framework (see, T. Evgeniou and M. Pontil, "Regularized multi-task learning," SIGKDD (2004), hereinafter, "Evgeniou 2004", for a discussion of multi-task learning). This results in what is referred to herein as an Ensemble of Instance Trackers (EIT). In the joint learning, each appearance model $w_i$ is updated online to adapt to a specific object 26, 28 and its variations observed across the video, while being constrained to share features with the other appearance models $w_j$ through multi-task regularization. The learned individual appearance models are combined into a category-level detection model (set of parameters) $w_C$ for the specific detector (SD) 10. The specific detector 10 can then be run on the entire video 12 (or subsequent frames of the video stream) in order to detect all instances of objects of interest, i.e., generalizing beyond just the few seed objects.

A benefit of using an ensemble of trackers 31 to learn the model for the specific detector 10 is that unambiguous positive and hard negative training examples can be obtained in a principled way under the P-N learning framework. Each positive training example 48, 49 for a given instance detector 40 is constrained to include pixels which are in the respective candidate region 36, 38 predicted by the respective tracker 32, while hard negative training examples 50, 51 are those which the detector 40 incorrectly identifies as positive, based on the current appearance model, but which do not lie within the candidate region 36, 38 for the respective image. Thus, for example, the positive example 49 lies within candidate region 36, while hard negative sample 50, 51 (here, a tree) each lies outside the respective candidate region 38 for that image. As an example, when tracking a particular object (e.g., car A), positives and hard negatives are detected at the instance level. This means that the positive training examples 26, 48 are image sub-regions that strongly overlap with car A, whereas negatives are all the windows that do not overlap (or overlap only minimally) with that specific part of the image (potentially including other cars, such as car B). Therefore, negatives (and hard negatives) can be obtained unambiguously from predicting the location of the specific object of interest, while positives can be obtained by following the object in subsequent frames. In contrast, most related approaches work at the category level, and either require fully annotated data, where all the objects of interest must be labeled, in order to know what parts of the image are considered as positive or negative for the detector, or exploit heuristics to select the positives while not considering hard negatives. See, for example, X. Wang, et al., "Detection by detections: Non-parametric detector adaptation for a video," CVPR (2012), hereinafter, "Wang 2012"; K. Tang, et al., "Shifting weights: Adapting object detectors from image to video," NIPS (2012); M. Wang, et al., "Transferring a generic pedestrian detector towards specific scenes," CVPR (2012); K. Okuma, et al., "Self-learning for player localization in sports video," Technical report arXiv:1307.7198, hereinafter, Okuma.

Tracking individual object instances (e.g., Car A and Car B) is not sufficient, however, to learn a useful model $w_C$ of the entire category of interest (cars), which is the goal. As will be appreciated, learning a category-level model $w_C$ for the specific detector 10 in an unsupervised setting is difficult, because there is no clear definition of the category. In the exemplary embodiment, the appearance models $w_i$ (parameters) are jointly learned using a mean-regularized multi-task tracking (MR-MTT) formulation detailed below. This allows the appearance models of each specific object to be tied together by a shared latent model of the category. The latent category-level model $w_C$ learned by the algorithm may thus correspond to the mean of the instance-level appearance models $w_i$, although other methods of aggregation are also contemplated, such as identifying the median. Therefore, the specific object detector model $w_C$, which is the average or other aggregation of the instance-level appearance models is jointly learned with the instance-level models $w_i$, which also improves the tracking of each instance, as each instance-level model $w_i$, used by the tracker can share features with the other related trackers.

This approach for unsupervised learning of a video-specific object detector 10 using multi-task learning provides several advantages over existing methods, including:

1. A principled selection of training examples (positives and hard negatives), as mentioned above;

2. Exploiting temporal correlations during training, which are generally ignored (e.g., by Wang 2012);

3. Ease of deployment and continuous adaptation; each camera only needs a generic black-box detector 24 and the present on-line tracking-by-detection algorithm to learn a category-level specific detector 10. In other domain adaption approaches, constant access to the source training data is used to learn the detector. In practice, this is costly, as it requires storing vast amounts of data on each camera or massive network communications with a remote server (see, e.g., K. Tang, et al., "Shifting weights: Adapting object detectors from image to video," NIPS (2012); M. Wang, et al., "Transferring a generic pedestrian detector towards specific scenes," CVPR, (2012), hereinafter, "M. Wang 2012");

4. Applicability to scenes containing static objects (e.g., parked cars, still pedestrians) and to mobile camera settings (e.g., for vehicle-mounted cameras), as the method does not need to rely on motion detection or background subtraction (unlike M. Wang 2012, and Okuma).

Returning to FIG. 2, the exemplary system 1 may be hosted by one or more computing devices, such as the illustrated computer 60, having memory 62 which stores instructions 64 for performing the exemplary method and a processor 66 in communication with the memory for executing the instructions. One or more network interface devices 68, 70 provide for communication with external devices. Hardware components 62, 66, 68, 70 are communicatively connected by a data/control bus 72. The computer 60 may be incorporated into the image capture device 22. In another embodiment, two or more image capture devices 22, 74 may utilize the same system 1, e.g. via wired or wireless links, such as a local area network or a wide area network, such as the Internet.

The instructions 64 include the tracking component 30 and learning component 44, and may further include an object detection component 76 which serves to apply the learned object detector 10. Once the specific detector 10 has been learned, it can be applied, by the object detector 76, to video data from the capture device 22 for detection of more objects in the category of interest. Information 80, output by the system may include one or more of: the detector 10, detection model $w_C$, and information generated by applying the detection model to video data.

The computer system 1 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 62 may represent any type of non-transitory computer readable medium such as random access memory (RAM), read only memory (ROM), magnetic disk or tape, optical disk, flash memory, or holographic memory. In one embodiment, the memory 62 comprises a combination of random access memory and read only memory. In some embodiments, the processor 66 and memory 62 may be combined in a single chip. Memory 62 stores instructions for performing the exemplary method as well as the processed data 10, 40, 41, 42, 43, etc.

The network interface 68, 70 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 66 can be variously embodied, such as by a single-core processor, a dual-core processor (or more generally by a multiple-core processor), a digital processor and cooperating math coprocessor, a digital controller, or the like. The digital processor 66, in addition to controlling the operation of the computer 60, executes instructions stored in memory 62 for performing the method outlined in FIGS. 1 and 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 60. Since the configuration and operation of programmable computers are well known, they will not be described further.

Figure 3:
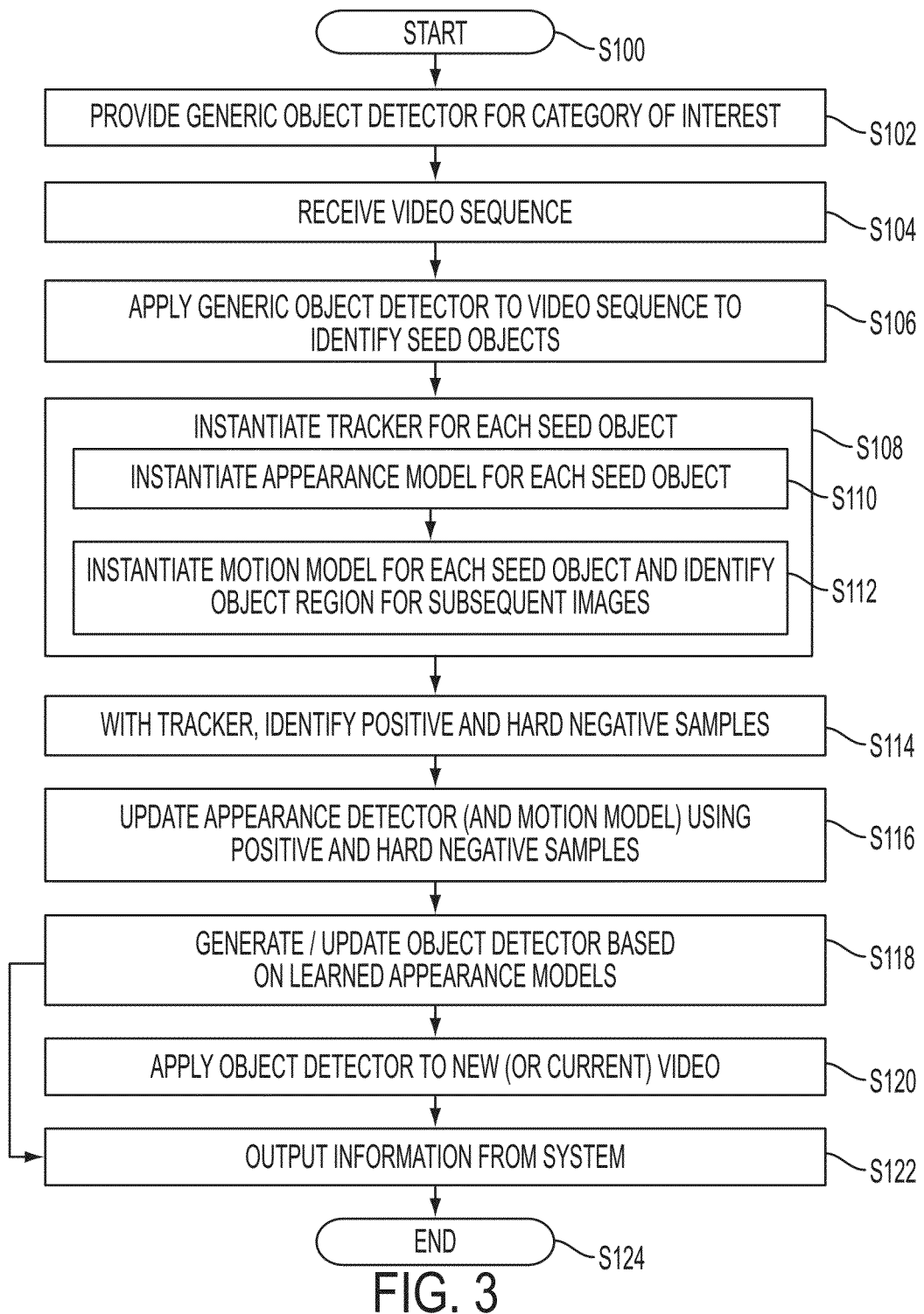
FIG. 3 is a flow chart illustrating a method for generating a category-level object detector in accordance with another aspect of the exemplary embodiment.

With reference now to FIG. 3, an exemplary method for object detection is illustrated. The method begins at S100.

At S102, a generic object detector GD 24 is provided for the category of interest.

At S104, a video sequence 12 is received from an image capture device 22.

At S106, the generic object detector 24 is applied to the video sequence, or portion of the sequence to identify seed objects 26, 28. In particular, a window of fixed height and width is moved across at least a part of the image to identify the most probable windows for the object of interest.

At S108, for each seed object, a tracker is instantiated by the tracking component 30. Specifically, at S110, an initial appearance detector 40, 41 $w_i$ is instantiated for each seed object and at S112, a respective initial motion model 42, 43 $m_i$ is instantiated. The motion model 42 is used to identify an object region 36, 38 by predicting the location of a respective seed object 26 for at least one of a sequence of subsequent images.

At S114, for each seed object 26, 28, positive and hard negative samples are extracted by applying the current (e.g., initial) appearance detector to one or more of the subsequent images (with the learning component 44), using the predicted locations (object regions) of each seed object to distinguish the positive samples from hard negatives, the negative samples thus including sub-images outside the object region that the current appearance model would otherwise have labeled as positive.

At S116, the positive and negative samples are used to update the parameters $w_i$, of the appearance detectors 40, 41 through joint learning by the learning component 44, e.g., using an iterative learning method, such as a gradient descent method.

At S118, a specific object detector model $w_C$ is learned for the category based on the set of appearance models $w_i$ and a specific object detector 10 incorporating the model $w_C$ is formed.

At S120, the learned specific object detector 10 may be applied to new video from the same image capture device 22 and/or location.

At S122, information 80 is output from the system 1, such as the new specific object detector 10, its model $w_C$, and/or information about objects detected in the video. For example, each identified vehicle may be labeled in the same or a new video stream in one exemplary embodiment.

The method ends at S124.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 60, (for example, an internal hard drive of RAM), or may be separate (for example, an external hard drive operatively connected with the computer 60), or may be separate and accessed via a digital data network such as a local area network (LAN) or the Internet (for example, as a redundant array of inexpensive of independent disks (RAID) or other network server storage that is indirectly accessed by the computer 60, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for object detection. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Figure 4:
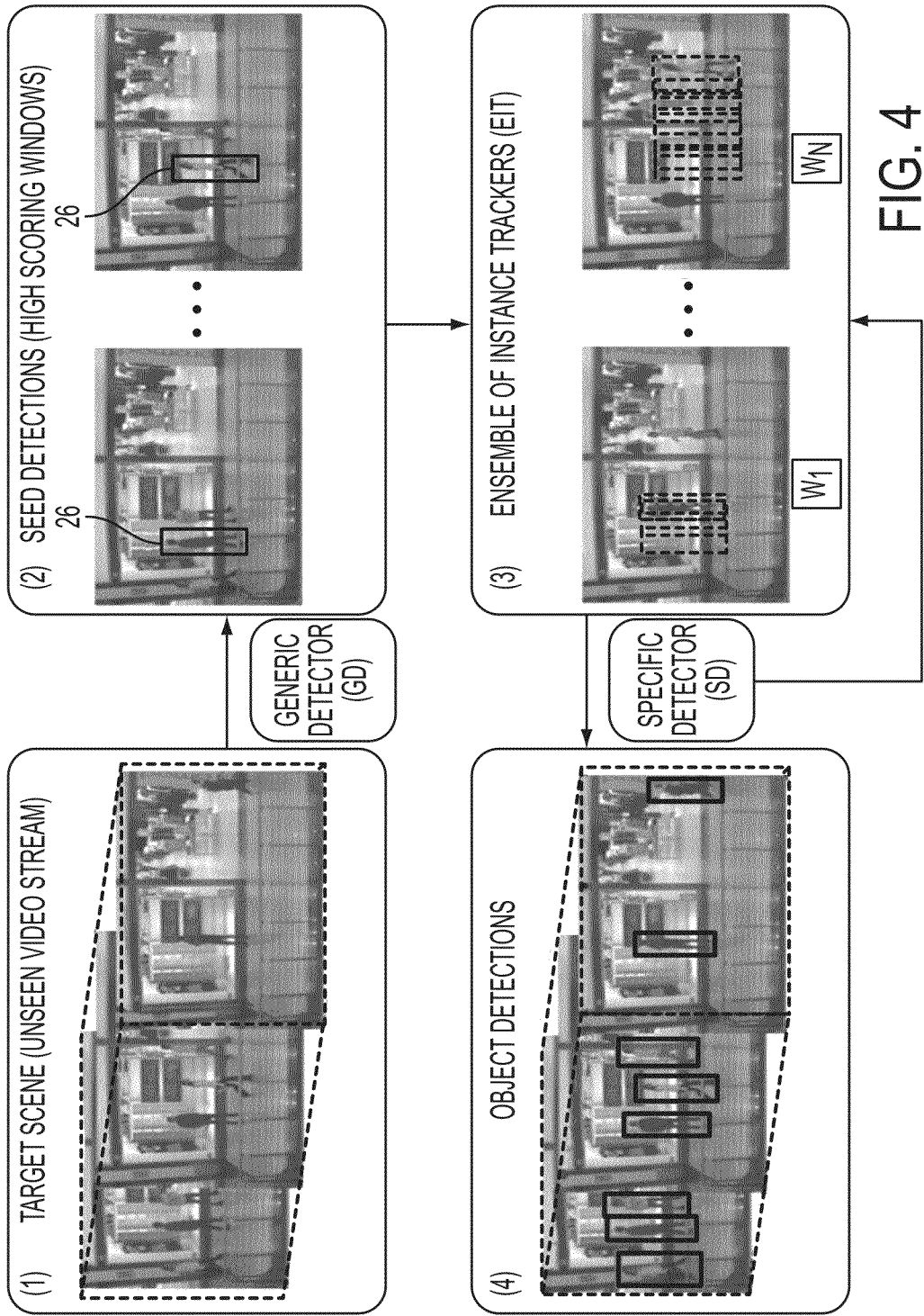
FIG. 4 shows photographic images illustrating an application of the exemplary method.

FIG. 4 illustrates the exemplary method on a sequence of frames of a video taken of people walking through a shopping mall. The method starts at (1) with an unseen video sequence. At (2) with the generic detector, seed objects (people) 26, 28 are identified as high scoring windows in one or more of the frames. At (3) using the respective motion model, a region comprising windows where the person is expected to be found is identified for each seed. Appearance models for the two seeds are initialized. The specific detector is learned over a series of iterations and at (4) is applied to the same or a new part of the video stream to identify more of the people.

Further details of the system and method will now be described.

Mean-Regularized Multi-Task Tracking

As used herein, an "object detector" such as detectors 40, 41, 10, denotes a classifier parameterized by a (learned) vector $w \in \mathbb{R}^d$, i.e., a vector of d real values, where d may be, for example, at least 10, or at least 100, or at least 1000 or more, such as about 4000 or about 8000. This classifier computes the probability that an image region x represented by a feature vector $\phi(x) \in \mathbb{R}^d$ (i.e., the same number of dimensions d as in w) contains the object of interest as a function of the product of the learned vector w and the region feature vector $\phi(x)$ (and optionally an offset b), e.g., according to:

$$P(x) = \frac{1}{1 + e^{-(w^T \phi(x) + b)}}. \quad (1)$$

$w^T$ represents the transpose of vector w, which can correspond to $w_i$ in the case of detectors 40, 41, and to $w_C$, in the case of detector 10.

Although Eqn. 1 describes a linear classifier, the method can also be applied to non-linear settings, e.g., by using explicit embeddings (see, F. Perronnin, et al., "Large-scale image categorization with explicit data embedding," CVPR (2010)). In particular, a window of fixed height and width is moved across at least a part of the image to identify the most probable windows for the object of interest.

Detection of Seeds (S106)

In this step, an imaginary window of fixed height and width is traversed across at least a part of each image (frame) in a sequence of images to identify the most probable windows for the object of interest. The term "detected region" may denote a set of bounding box coordinates and/or the corresponding sub-image. In this step, the most confident detections of the GD are selected as the seeds 26, 28. Various freely and commercially available object detectors are suited for this purpose. For example, the method of Wang 2012 may be used. An example GD, referred to as DPM, is described in Felzenszwalb 2010.

In one embodiment, as the window traverses the image, a set of image regions (sub-images) is generated, which may be overlapping or not, and the probability P(x) is computed according to Eqn. 1. for each of these regions, for example, using the parameters w and b, denoted $w_G$ and $b_G$ (which is a constant), of the generic detection model 24. The generic detector 24 may have been trained offline with feature vectors $\phi(x)$ extracted from training windows of labeled images in which the location of the object of interest is identified (e.g., by a bounding box, or at the pixel level). Each training window can thus be assigned a label (e.g., a binary label corresponding to, positive or negative), which is input to the classifier together with the respective feature vector to learn the parameters $W_G$ and $b_G$. However, other methods for detection of the seeds which do not rely on these methods/parameters are also contemplated. The generic detector 24 can be simply treated as a black box which outputs a few windows x (the seed detections) that are then assumed to contain the object of interest (e.g., a car).

The trained GD 24 is assumed to be functioning in a high-precision and low-recall regime. The GD 24 looks at each image of the video sequence independently and identifies windows (image sub-regions) for which the GD has a high confidence that an object of interest is present. Therefore, the seeds 26, 28 tend to correspond to correct detections. In one embodiment, the GD 24 ranks the detections in order of confidence that the image sub-region includes the object of interest. The N top-ranked detections may be selected as seeds, where N may be a predefined number. Additionally or alternatively, only those detections which meet a threshold confidence may be selected as seeds.

P-N Learning for Tracking-by-Detection

Each of the seeds 26, 28 generated at S106 is followed with a tracking algorithm, which can be based on Positive-Negative (P-N) learning. This may be performed according to the method of Kalal 2012. In the exemplary P-N learning method, a tracker 30, 32 maintains an appearance detector 40, 41 with parameters $w_i$ and a motion model 42, 43, etc., denoted $m_i$. The parameters $w_i$ of each appearance detector 40, 41 may be instantiated with values computed based on feature vectors extracted from positive regions (within or in close proximity to the seed window) and negative regions (outside the seed window) extracted from the frame in which the seed was found.

The motion model $m_i$ defines a search region 36 around the previous estimate of the object's location. The search region may be defined by a radius or a bounding box, and may include a set of two or more windows, but less than the entire image). The search area 36 may be determined by median interpolation of the optical flow field. As an example, the Kanade-Lucas-Tomasi (KLT) algorithm may be used to compute efficiently the sparse optical flow from the previous location (see, S. Baker, et al., "Lucas-Kanade 20 years on: A unifying framework," 56: 221-255 (Springer, 2004). This method predicts, for each of a set of pixels identified as being in the object in a first frame t, where each of those pixels will be in a second, subsequent frame t+1. This is performed with a local search by comparing a pixel in frame t with pixels in a radius of, for example, 20 pixels, in frame t+1 to identify a matching pixel and from these matching pixels, updating motion model $m_i$. Then, from the previous estimate of the location of the object at frame t, the new location in a frame t+1 is estimated by running the current appearance detector $w_i$ on the new frame to generate a set of detections (windows that the appearance detector considers positive), and then selecting the detection that is the most likely according to the current motion model $m_i$. The tracker's parameters $w_i$ and $m_i$ are then updated with this new detection considered as positive, while the other detections are treated as negatives. These negative windows serve as hard negatives, as they correspond to false detections mistakenly made by the previous model.

Each seed object is tracked as long as it can be detected. When the motion model prediction and the appearance detector positives no longer overlap, it can be assumed that the object being tracked, is no longer within the field of view and the corresponding model is no longer updated, although it can still be used to compute the specific detector $w_C$. However, to allow for cases where the object may temporarily pass behind an obstruction, such as a pole or a tree in the case of a person, the detector may be allowed to skip a few frames and continue detection when the object reappears.

The Ensemble of Instance Trackers (EIT) Model

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Let N be the number of seeds 26, 28, etc., each one associated with a respective current vector of parameters $w_i$, where $i=1 \ldots N$. N can be at least 2, such as at least 10, or at least 50. The more seeds that are identified is generally better, but not at the expense of precision. The current vector $w_i$ is updated based on the new detection by optimizing a loss function. In an exemplary embodiment, updating each appearance detector amounts to minimizing the regularized empirical risk:

$$w_i^* = \underset{w_i}{\operatorname{argmin}} \sum_k \ell(x_k, y(x_k), w_i) + \lambda \Omega(w_i), i = 1 \ldots N \qquad (2)$$

where $x_k$ is the feature descriptor of the kth detection (i.e., a window in P-N learning). This corresponds to a random window (to obtain negatives during initialization), a seed from the generic detector, or a detection obtained from the previous model;

$y(x_k)$ is the label (e.g., positive or negative, as described above);

$l(x_k, y(X_k), w_i)$ is the loss incurred by classifying $x_k$ as y using parameters $w_i$ (for example, a hard negative is a sample classified as positive by the current model and thus increases the loss); and $\Omega(w_i)$ is a regularization term, and λ is a weighting parameter which adjusts how much emphasis is applied to the regularization term vs. the loss term. Since there is no training data as such for learning λ it can be automatically selected to assign the positives that match the motion model higher scores than those that do not. In general, λ may be from about 0.001 to 0.2, such as about 0.1.

The loss function of Equation (2) identifies, for a given tracker, the parameters $w_i$, denoted $w^*_i$, which minimize the sum over all the k detections of the incurred loss l incurred by classifying those of the k sub-images erroneously with the current appearance model, based on the identified hard negatives, plus the weighted regularization term $\lambda \Omega(w_i)$, which is positive (or 0 in the limit).

The loss function given in Eqn. (2) is exemplary. Other loss functions may alternatively be employed.

The updating (S116) can be applied in batch mode when the model w is run on all frames of the video and updated, then rerun on all the frames, or in a streaming mode, where only a set of one or a few frames is used to learn the model which may be then rerun on a subsequent set of frames, and so forth.

The set of N trackers, with joint detector parameters $W=\{w_i, \ldots, w_N\}$ is denoted as an ensemble of instance trackers (EIT). With this notation, the N equations in Eq. (2) can be expressed as a joint minimization over the ensemble parameters with a loss function as shown in Eqn. (3):

$$W^* = \underset{W}{\operatorname{argmin}} L(X, y, W) + \lambda \Omega(W), \qquad (3)$$

where $L(X,y,W)$ is the loss over all the appearance detectors and $\lambda\Omega(W)$ is the corresponding weighted regularization term.

In the exemplary embodiment, $L(X,y,W) = \Sigma_i l(x_k, y(x_k), w_i)$.

As will be appreciated, if $L(X,y,W) = \Sigma_i l(x_k, y(x_k), w_i)$ and $\Omega(W) = \Sigma_i \Omega(w_i)$, Eq. (2) is recovered exactly, where the appearance model of each tracker is optimized independently. In order to jointly learn all the trackers, a regularization term which is a function of a distance (or discrepancy) measure between appearance models is imposed instead. For example, the following regularization term may be employed in Eqn. (3):

$$\Omega(W) = \frac{1}{2N^2} \sum_{i=1}^N \sum_{j=1}^N \|w_i - w_j\|_2^2 \qquad (4)$$

where $$\|w_i - w_j\|_2$$

denotes the $l_2$ norm of $w_i - w_j$ and each $w_i$ is one of the parameter vectors $w_i$. This provides a regularization term which is a function of the average of all pairwise differences between the appearance models. In computing the difference between the two vectors $w_i - w_j$, each element is considered independently and the value of the element of the second model is subtracted from the corresponding value of the first model in the pair. As will be appreciated, rather than the $l_2$ norm, another distance measure between pairs of parameter vectors may be employed. For example, Eqn. (4) may be computed as the sum of the distances between $w_i$ and the median of the appearance vectors. Additionally or alternatively, some other function of the sum of the distance measure over all pairs of parameter vectors may be substituted for Eqn. (4). As will be appreciated if the value of regularization term is lower, i.e., the appearance models are more similar to each other, the more likely it is that Eqn. 3 will be minimized.

The regularization term penalizes pairs of trackers with large differences between their parameter vectors $w_i$, thus promoting solutions where classifiers 40, 41 are similar to each other. This approach is known as mean-regularized multi-task learning (MR-MTL) (see, e.g., Evgeniou 2004), and it is equivalent to imposing a constraint that each $w_i$ should not deviate much from the mean of all the $w_i$'s. Therefore, this regularization inhibits each detector from overfitting to the appearance of the individual object appearances, and allows them to generalize across tasks by modeling the latent commonalities (the appearance of the category) as the mean of the parameter vectors $w_i$ of the trackers.

An advantage of this approach is that the average (e.g., mean) of the $\{w_i\}$ serves as an effective, single category-level detection model $w_C$. Consequently, once the trackers are learned, training the specific detection model $w_C$ can be readily achieved, e.g., as:

$$w_c = \frac{1}{N} \sum_{i=1}^N w_i. \qquad (5)$$

In computing the mean, each dimension is considered independently and its values averaged over all the $w_i$'s. In practice, this simple mixture model is particularly adapted to high-dimensional features, $\phi(x) \in \mathbb{R}^d$ with $d \gg 1$.

Another benefit of this regularization is that it allows learning a model $w_C$ that is more robust to erroneous seeds (initial false detections by the generic detector). It is to be expected that their appearance models will significantly differ from the mean, and, therefore, the corresponding trackers will be quickly determined to be under-fitting. As a result, they will generally fail to track these erroneous seeds for more than a few frames. This may also be used as an indicator that they can be dropped from the set of trackers. In contrast, the correct seeds will be tracked for longer, as they share common appearance factors, thus contributing more to the category model. It may be noted that the $l_2$-norm used in Eqn. (4) is not very robust to outliers. Therefore, the handling of erroneous seeds may be improved by using more robust alternatives, e.g., sparsity-inducing regularizers, replacing the mean by the median, or outlier detection methods. However, this may be at the cost of a more complex and computationally demanding solution.

Learning the model (S118)

The above optimization problem (Eqn. (3)) can be solved using Stochastic Gradient Descent (SGD) with an update rule as follows:

$$w_i \leftarrow w_i - \eta \left( \frac{\partial \ell}{\partial w}(x_k, y_k, w_i) + \lambda \left( w_i - \frac{1}{N} \sum_{j=1}^{N} w_j \right) \right), \quad (8)$$

where $\eta$ is the learning rate, and $$\frac{\partial \ell}{\partial w}$$

depends on the loss function and is evaluated for a randomly selected training sample $(x_k, y_k)$. When updating an appearance model from the positive and negative windows obtained by the method described above, multiple passes (called epochs) can be made over the randomly shuffled windows, such as 2, 3, 4 or more passes through all the windows. Note that Equation (6) shows that the learning process is a joint one: the update of the detector $w_i$ includes a contribution of all the other detectors $w_j$, $j \neq i$.

For further details on SGD, see, L. Bottou, "SGD," available at http://leon.bottou.org/projects/sgd.

The selection of the values of the hyper-parameters of the algorithm, such as the learning rate $\eta$ (Eq. 6), the regularization parameter $\lambda$ (Eq. 3), and the number of epochs can be performed by a variety of methods. Cross-validation, typically used to tune hyper-parameters, is not generally applicable in the exemplary embodiment where only one positive example is available at a time. Furthermore, optimizing window classification performance may not be guaranteed to result in optimal detection performance due to the additional post-processing steps applied in the sliding window approach (see, R. G. Cinbis, et al., "Segmentation driven object detection with Fisher vectors," ICCV (2013), hereinafter, Cinbis 2013). Therefore, in the exemplary embodiment, a simple strategy includes selecting the least-over-fitting parameters: e.g., smallest $\eta$ and number of epochs, and largest $\lambda$, that maximize the rank of the correct detection in the current frame.

Detection Framework

The exemplary EIT framework is suitable for any detector based on a linear classifier. In a new implementation of the EIT method, the following are specified: (i) how to compute features $\phi(x)$ of a sub-image x, and (ii) the loss function $l(x,y,w)$ which is to be employed. While choices for each of these may depend on the application, in one embodiment a useful feature vector is the Fisher Vector and as the loss function, the logistic loss is employed. Other loss functions, such as the hinge loss, may alternatively be used. The loss function accounts for the hard negatives as well as for the positives and (initially) random negatives.

For some embodiments, the detector should be efficient to re-train, as N detectors may need to be updated in a streaming fashion through the video. To achieve that efficiency, detectors based on linear classifiers and SGD (e.g., Eq. (6)) are particularly suitable, which avoids the need for re-training the generic detector (GD). The GD can simply be used as a black box, i.e., no assumptions on how to train it need to be made and it can simply be used as an oracle outputting a few seed detections on a subset of the target video stream. Furthermore, generic detectors often rely on computationally expensive training procedures, taking on the order of days to train on highly-efficient hardware. This is the case for the GD described in Felzenszwalb 2010.

Sub-Image Feature Descriptor

For the sub-image features $\phi(x)$, Fisher Vectors (FV) may be employed. See, for example, F. Perronnin and C. Dance, "Fisher kernels on visual vocabularies for image categorization," CVPR (2007); Perronnin, Sanchez and Mensink, "Improving the Fisher kernel for large-scale image classification", ECCV, 143-156 (2010); Sanchez and Perronnin, "High-dimensional signature compression for large-scale image classification," CVPR (2011); J. Sanchez, et al., "Image Classification with the Fisher Vector: Theory and Practice," IJCV (2013), "Sanchez 2013"; U.S. Pub. No. 20120076401, published Mar. 29 2012, entitled IMAGE CLASSIFICATION EMPLOYING IMAGE VECTORS COMPRESSED USING VECTOR QUANTIZATION, by Jorge Sanchez, et al.; and U.S. Pub. No. 20120045134, published Feb. 23, 2012, entitled LARGE SCALE IMAGE CLASSIFICATION, by Florent Perronnin, et al. the disclosures of which are incorporated herein by reference in their entireties.

Although FVs have not previously been applied to tracking, FVs are known to be good features for image classification (see, Sanchez 2013) and for object detection (Q. Chen, et al., "Efficient maximum appearance search for large-scale object detection," CVPR (2013), hereinafter, "Chen 2013"; Cinbis 2013), which allows for learning powerful specific detectors. FVs have also proved their efficiency for retrieval problems (see, H. Jégou, et al., "Aggregating local image descriptors into compact codes," IEEE TPAMI (2012)). This allows for effective tracking individual object instances with the EIT approach. FVs are high-dimensional features and, therefore, are well suited to the exemplary mean-regularized multi-task learning algorithm.

A specific implementation will now be described. First, local patches of 16×16 pixels (although smaller or larger patches can be used) are extracted densely from the sub-image on a regular grid at a number of, e.g., 15, different scales (scales are obtained by down-sampling). For each patch, low-level features are extracted, such as shape, color and/or gradient (SIFT) features (see, D. Lowe, "Distinctive image features from scale-invariant keypoints", IJCV, 2004). For example, each patch is represented by a 128-dimensional SIFT descriptor, which may be compressed with Principal Component Analysis (PCA) to 32 dimensions. A visual vocabulary is computed by estimating a Gaussian mixture model (GMM) of 128 components with a subset of the descriptors obtained from the first frames of the video stream, using for instance K-means clustering analysis.

The patch descriptors are input to the generative model which outputs a feature vector based thereon. Each feature vector is thus a fixed-length vectorial representation of the sub-image in a d-dimensional space. In general, each feature vector has at least 30, or at least 60, or at least 100, or at least 500 dimensions, and up to 1000 or more dimensions, each dimension having a respective feature value, which may be reduced to fewer dimensions.

Other image representations may be used such as the bag-of-visual-words of Csurka et al., Visual Categorization with Bags of Keypoints, ECCV Workshop, 2004.

Other exemplary methods for computing feature vectors are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

Loss Function

For training the classifier, the logistic loss may be employed:

$$l(x,y,w)=\log(1+\exp(-y(w^T\phi(x)+b))) \quad (7)$$

for which the SGD derivative needed in Eq. (6) can be computed in closed-form. In this embodiment, the window classifier (Eqn. (1)) corresponds to standard logistic regression. As an alternative, the hinge loss or quadratic loss may be used.

Detector Initialization

The detectors 40, 41 for each tracker of the ensemble can be initialized by using the seed detections 26, 28 of the GD as positive examples and non-overlapping random sub-images as negative examples. The set of positives can be augmented by applying small random translation and scaling transformations to the seed detection.

The exemplary system and method find application in a variety of cases. For example, it may be employed for video enforcement for traffic or parking violations. A large number of cameras may be deployed around an enforcement area, such as a city, all running the same detection vehicle method. However, the cameras may face different street and scene configurations, different camera viewpoints, distance to vehicles, and variations in illumination conditions among others, where the individual learning of a specific detector for each camera is advantageous. In another embodiment video cameras may be installed on public transportation, such as school buses, for example, to detect vehicles overtaking the bus when it is stopped. In another embodiment, cameras may be installed on street-sweeping trucks to detect speed violations. In yet another embodiment, the method may be employed for bus lane enforcement by mobile cameras used to detect vehicles in a category other than buses, such as passenger cars. In yet another embodiment, the method may be employed for detection of the number of people in vehicles traveling in passenger cars in high occupancy vehicle (HOV) lanes. For this embodiment, two types of specific detectors may be trained for each camera and/or location, one for people and one for cars.

Without intending to limit the scope of the exemplary embodiment, the following Examples illustrate the application of the method to detection of people and vehicles.

EXAMPLES

Datasets

Publicly available benchmarks were used: five video sequences from the CAVIAR database (http://homepages.inf.ed.ac.uk/rbf/CAVIAR/), and one video sequence from the VIRAT database (http://www.viratdata.org). Objects of interest in CAVIAR are persons, while in VIRAT, objects of interest are cars. Some statistics on the dataset are shown in Table 1.

TABLE 1

Dataset statistics

| | frame size | fps | #frames | class | #objects |
|---|---|---|---|---|---|
| CAVIAR (Ols1) | 576 × 768 | 25 | 295 | pedestrian | 438 |
| CAVIAR (Ols2) | 576 × 768 | 25 | 1119 | pedestrian | 290 |
| CAVIAR (Osow1) | 576 × 768 | 25 | 1377 | pedestrian | 2402 |
| CAVIAR (Olsr2) | 576 × 768 | 25 | 560 | pedestrian | 811 |
| CAVIAR (Ose2) | 576 × 768 | 25 | 2725 | pedestrian | 1737 |
| VIRAT-0401 | 1080 × 1920 | 30 | 58K | car | 375K |

In order make a fair comparison with Wang 2012, the same sequences from CAVIAR (Ols1, Ols2, Osow1, Olsr2, and Ose2) were used and the same experimental setup, except as noted. The image size was upscaled by a factor of 2.0. Independent experiments were run on each of the five sequences. Each sequence is used both for unsupervised learning of the EIT and for evaluation of the SD 10 (the same "transductive" setting as in Wang 2012). This corresponds to the practical embodiment where the object detectors are continuously adapted along the video stream.

For VIRAT, sequence 0401 was used because it is fully annotated with both static and moving objects, and also corresponds to a typical parking scene. The size (375K objects) and duration of VIRAT-0401 (58K frames) allows splitting the sequence into two parts. The exemplary EIT was run on the first part of the video to learn the SD 10, whose performance is then evaluated on the second part. This corresponds to a situation where the unsupervised learning is done on an initial part of the video stream (calibration phase), and the system is applied on the rest of the stream without updating. This setting also allows evaluating the generalization error of the SD.

Generic Detector

The Deformable Part Model (DPM) of Felzenszwalb 2010 was used as a black box generic object detector. This generic detector is pre-trained on Pascal VOC 2007, and is publicly available online (http://www.cs.berkeley.edu/rbg/latent/voc-release5.tgz). The performance obtained by the DPM is shown in Table 2. Note that the original DPM results reported by Wang 2012 are slightly different (in some cases better, in some cases worse) from the ones obtained in these Examples, most likely because the latest version of DPM was used here, which is different from the older one used by Wang 2012.

In preliminary experiments a generic objectness detector (B. Alexe, et al., "Measuring the objectness of image windows," IEEE Trans. on PAMI (2012)) was also considered, but it was found that starting with DPM yielded better results. Objectness makes some assumptions on saliency that may not be useful in some cases (e.g., in a parking scene, cars are not considered salient, whereas here, they should stand out as objects).

Results

The specific detector (SD) 10 obtained by the exemplary Multi-Task Ensemble of Instance Trackers (MT-EIT SD) was compared to three other object detectors applicable in an unsupervised setting:

1. The generic detector (GD) (Felzenszwalb 2010) used alone over the whole video;

2. An implementation of the "Detection by Detections" (DbD) unsupervised object detection approach of Wang 2012, which relies on re-ranking the GD detections according to their similarities with the FV descriptors of the highest scoring ones (the ones used in MT-EIT SD as seeds); note that this is a transductive-only approach, therefore, not directly applicable to scenarios like VIRAT;

3. The exemplary EIT algorithm without mean-regularized multi-task tracking, where the trackers are learned independently, referred to as "I-EIT".

Table 2 shows quantitative experimental results. Performance is measured using Average Precision (AP), which corresponds to the area under the precision-recall curve. It is the standard metric used to measure object detection performance (M. Everingham, et al., "The Pascal visual object classes (VOC) challenge," ICCV 88(2):303-338 (2010)).

TABLE 2

| Performance on detection | | | | | | |
|---|---|---|---|---|---|---|
| | Ols1 | Ols2 | Olsr2 | Osow1 | Ose2 | VIRAT-0401 |
| GD (Felzenszwalb 2010) | 30.4 | 52.4 | 34.9 | 52.2 | 34.8 | 47.0 |
| DbD (Wang 2012) | 32.1 | 56.3 | 43.1 | 47.0 | 40.9 | N.A. |
| I-EIT SD | 27.4 | 53.6 | 40.6 | 51.9 | 38.9 | 53.1 |
| MT-EIT SD | 29.3 | 58.0 | 43.7 | 53.1 | 38.1 | 53.7 |

It can be observed from TABLE 2 that the exemplary MT-EIT SD method improves over the generic detector by +4% on average over the different scenarios. This confirms that unsupervised learning of the exemplary simple and efficient detector 10 for a specific scene can outperform a state of the art, carefully tuned, complex, and generic object detector trained on large amounts of unrelated data. An improvement was found in all scenarios but one (Ols1), which corresponds to the smallest video, which is roughly ten seconds long (Table 1). This suggests that a video of this length is not sufficient to build a specific detector that is better than the generic detector trained on much more data (thousands of images in the case of Pascal VOC).

It can also be seen that jointly learning all trackers (MT-EIT SD) gives an improvement of +1.7% on average over learning them independently (I-EIT SD). For some scenarios, the gain is substantial (+4.4% on Ols2), while for one scenario it slightly degrades performance (−0.8% on Ose2). This suggests that the multi-task tracking formulation can help building a better specific detector when the tracked seed instances share appearance traits useful to recognize the category of objects of interest. A more robust multi-task learning algorithm than the simple mean-regularized formulation may be employed in order to handle more robustly outliers and the large intra-class variations typically present in broad object categories like cars.

The MT-EIT SD method yields a small improvement over the DbD method (+0.6% on average over the CAVIAR scenarios). This suggests that the method is accurate enough to discard the generic detector after seeing a large enough part of the video stream (to get enough seeds), whereas DbD must constantly run the generic detector, as it is a lazy learning approach based on k-nearest neighbors (it does not output a specific detector). It may also be noted that DbD could be applied as a post-processing step on the results of the specific detector 10 in order to improve performance, but this would lead to additional computational costs.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating a specific object detector comprising:
    with a generic detection model trained to identify objects in an object category, identifying a plurality of seed objects, each seed object being identified in a frame of a video sequence;
    for a plurality of iterations,
        for each of the plurality of seed objects:
            with a current motion model, identifying an object region in a different frame of the video sequence where the seed object is predicted to be located, and
            with a current appearance model, labeling sub-images of the different frame as positive or negative, and identifying as hard negatives, sub-images outside the object region that the current appearance model labels as positive for the object category; and
        with a processor, jointly updating the current appearance models for the plurality of seed objects to optimize a loss function which includes a regularization term that is a function of a distance between the current appearance models; and
    forming the specific object detector, comprising aggregating the appearance models of at least one of the iterations.

2. The method of claim 1, wherein the regularization term is a function of a sum over all pairs of appearance models, of the distance between the current appearance models.

3. The method of claim 2, wherein the distance between the current appearance models is measured as the $l_2$ norm between each pair of appearance models.

4. The method of claim 1, wherein the loss function includes a loss term which aggregates, over the appearance models, the loss incurred by classifying a set of sub-images erroneously with the current appearance model, based on the identified hard negatives.

5. The method of claim 1, wherein the loss function is of the general form:

$$W^* = \underset{W}{\operatorname{argmin}} L(X, y, W) + \lambda \Omega(W), \quad (3)$$

where L(X,y,W) is the loss, over all the appearance models, incurred by classifying a sub-image as y based on current appearance model parameters and features of the sub-image, Ω(W) is the regularization term, and λ is a weight.

6. The method of claim 5, wherein the loss L(X,y,W) is a sum of the loss for each of the appearance models.

7. The method of claim 6, wherein the loss for each of the appearance models is computed as the logistic loss.

8. The method of claim 5, wherein the regularization term is a computed as a function of the sum over all pairs of appearance models of the distance between the appearance models in the pair.

9. The method of claim 5, wherein the regularization term is a computed as:

$$\Omega(W) = \frac{1}{2N^2} \sum_{i=1}^{N} \sum_{j=1}^{N} \|w_i - w_j\|_2^2 \quad (4)$$

where $$\|w_i - w_j\|_2$$

denotes the $l_2$ norm of a pair of appearance models $w_i$ and $w_j$ and N represents the number of the seed objects.

10. The method of claim 5, wherein the loss function is optimized by stochastic gradient descent.

11. The method of claim 5, wherein the aggregating the appearance models includes averaging the appearance models.

12. The method of claim 1, wherein each appearance model comprises a vector of parameters and the specific object detector is a linear classifier which classifies a sub-image as a function of the vector of parameters and a feature vector for the sub-image.

13. The method of claim 12, wherein the feature vector comprises a Fisher Vector.

14. The method of claim 1, wherein for each of the plurality of iterations the method further comprises updating each motion model by identifying a most probable location of the seed object with the respective updated appearance model.

15. The method of claim 1, wherein the method further comprises traversing at least one frame of the video sequence with a window of fixed size to generate the sub-images.

16. The method of claim 1, wherein the object category is selected from people and cars.

17. The method of claim 1, further comprising at least one of:
 outputting the specific object detector; and
 applying the specific object detector to the same or a new video sequence to detect objects in the object category.

18. A computer program product comprising a non-transitory recording medium storing instructions, which when executed on a computer, causes the computer to perform the method of claim 1.

19. A system comprising memory which stores instructions for performing the method of claim 1 and a processor in communication with the memory which executes the instructions.

20. A system for generating a specific object detector comprising:
 a generic detection model trained to identify objects in an object category, the generic detection model identifying a plurality of seed objects, each seed object being identified in a frame of a video sequence;
 a tracking component which instantiates an ensemble of trackers one for each of a plurality of seed objects detected with the generic detection model, each tracker comprising a motion model and a detection model;
 a learning component which learns a specific object detector, the learning comprising, for a plurality of iterations, for each of the plurality of seed objects:
  with a current motion model, identifying an object region in a different frame of the video sequence where the seed object is predicted to be located, and
  with a current appearance model, labeling sub-images of the different frame as positive or negative, and identifying as hard negatives, sub-images outside the object region that the current appearance model labels as positive for the object category; and
 jointly updating the current appearance models for the plurality of seed objects by optimizing a loss function which includes a loss term which accounts for the hard negatives and a regularization term that is a function of a distance between the current appearance models; and
 aggregating the appearance models of at least one of the iterations to generate the specific object detector; and
 a processor which implements the generic detection model, tracking component, and learning component.

21. A method for generating a specific object detector comprising:
 with a generic detection model trained to identify objects in an object category, identifying a plurality of seed objects, each seed object being identified in a frame of a video sequence;
 instantiating a tracker for each of the seed objects for tracking the seed object in subsequent frames of the video sequence, each tracker comprising a motion model and an appearance model, the motion model configured for identifying a region of a subsequent frame where the seed object is expected to be located, the appearance model configured for assigning a label that is selected from positive and negative for the seed object to each of a set of sub-images of the subsequent frame, hard negatives being identified as the sub-images in the set of sub images which are assigned a positive label by the appearance model and which are outside the identified region; and
 learning a specific detector for the category of objects comprising, jointly learning the appearance models by sampling the sub-images and iteratively updating the appearance models to optimize a loss function which includes a regularization term, which is a function of a distance between the current appearance models, and a loss term which aggregates, over the appearance models, the loss incurred by classifying a set of sub-images erroneously with the current appearance model, based on the identified hard negatives, and aggregating the updated appearance models,
wherein at least one of the identifying of the plurality of seed objects, instantiating the trackers, and learning the specific detector is performed with a computer processor.

* * * * *